US000001225H

United States Statutory Invention Registration [19]

[11] Reg. Number: H1225

[43] Published: Sep. 7, 1993

Foy et al.

[54] FALSE-TWISTING PROCESS FOR PRODUCING INTERTWINED YARN OF COMFORT AND HIGH CUT-RESISTANCE

[76] Inventors: Brian E. Foy, 832 N. Gwynn Ct., Bear, Del. 19701; Michael A. Kramer, 202C3 Galloway's Cross Rd., Greenville, N.C. 27858

[21] Appl. No.: 755,395

[22] Filed: Sep. 5, 1991

[51] Int. Cl.[5] ..... D02G 3/36
[52] U.S. Cl. ..... 57/5; 57/328
[58] Field of Search ..... 57/5, 328, 333

[56] References Cited

U.S. PATENT DOCUMENTS

| | | | |
|---|---|---|---|
| 3,365,872 | 1/1968 | Field | 57/144 |
| 3,367,095 | 2/1968 | Field | 57/5 |
| 3,490,224 | 1/1970 | Bourgeas | 57/210 |
| 4,069,656 | 1/1978 | Arai et al. | 57/328 X |
| 4,470,251 | 9/1984 | Bettcher | 57/230 |
| 4,489,540 | 12/1984 | Faure et al. | 57/5 |
| 4,777,789 | 10/1988 | Kolmes et al. | 57/210 |
| 4,825,470 | 5/1989 | Horio | 2/21 |
| 4,838,017 | 6/1989 | Kolmes et al. | 57/210 |
| 4,912,781 | 4/1990 | Robins et al. | 2/167 |
| 5,033,262 | 7/1991 | Montgomery et al. | 57/5 |

FOREIGN PATENT DOCUMENTS

| | | | |
|---|---|---|---|
| 2513121 | 10/1975 | Fed. Rep. of Germany | 57/5 |
| 3835169 | 4/1990 | Fed. Rep. of Germany | 57/5 |
| 53-35049 | 4/1978 | Japan | 57/5 |
| 63-6658 | 2/1988 | Japan | 57/5 |
| 63-303138 | 12/1988 | Japan . | |
| 1-183544 | 7/1989 | Japan . | |
| 2-14033 | 1/1990 | Japan | 57/5 |
| 2207444 | 2/1989 | United Kingdom | 57/5 |

*Primary Examiner*—Harold J. Tudor

[57] ABSTRACT

A false-twisting, intertwining and wrapping process can combine continuous metal wire into the core of a composite structure comprising also continuous textile fiber core elements in the core, interlocking discontinuous textile fibers within the core and with such discontinuous fibers as surface wrappings.

15 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FALSE-TWISTING PROCESS FOR PRODUCING INTERTWINED YARN OF COMFORT AND HIGH CUT-RESISTANCE

FIELD OF INVENTION

This invention relates to improving yarns, particularly their cut-resistance, and more particularly to a process for achieving this.

BACKGROUND OF THE INVENTION

Some industrial articles of clothing, such as protective gloves, are designed with an objective of protecting the wearer's skin. This has been difficult to achieve, consistent with providing garments that are comfortable to wear. Ideally, certain such articles should be made from yarns that have themselves superior cut-resistance, so that the gloves or other garments or articles themselves resist cutting by sharp instruments, edges or other hazards in the workplace. There is a need for an improved yarn of such cut-resistance.

Many synthetic fibers provide superior industrial yarns. For instance, the strength, heat resistance and other useful properties of aramid fibers, such as PPDT, poly (p-phenylene terephthalamide), sold commercially by Du Pont under the tradename "KEVLAR" is well known in this respect. It would be desirable, however, to provide yarns having improved cut-resistance, and with a soft covering, such as to enable industrial work garments, for instance, including protective gloves, to be made in a form that is comfortable to wear and yet can protect the wearer against cuts and like hazards.

The problem has been solved by the present invention, which provides a way to incorporate a continuous wire in the core of a wrapped yarn of the type disclosed (in the decade of the sixties) by Field in U.S. Pat. Nos. 3,365,872 and 3,367,095, the disclosures of which are hereby incorporated herein by reference. Briefly, Field taught a wrapped yarn of a core of at least two continuous integral core elements of relatively straight textile fibers (for instance continuous filament yarn bundles or spun yarns from staple fibers) and surface wrappings of discontinuous textile fibers (for instance natural or synthetic staple) tightly twisted about the core and with portions locked into the core, and a false twisting process for combining the two types of textile fibers to form his wrapped yarns. Field discloses "all synthetic and natural fibers and filaments, and combinations thereof" as being suitable raw materials for making his yarns (col. 3, line 21 et seq of U.S. Pat. No. 3,365,872) and lists several compositions that include metal fibers, glass fibers, and asbestos fibers (lines 50–51). Field did not, however, suggest incorporating a continuous metal wire into the core of his yarns, and when attempts were made, according to the invention, to try and incorporated a continuous metal wire into wrapped yarns of the types specifically disclosed by Field, several practical problems were encountered, and products resulting from such attempts were unsuitable for various reasons.

SUMMARY OF THE INVENTION

The problem has been solved according to the present invention by modifying the process taught by Field and succeeding in incorporating into certain of his wrapped yarns a continuous annealed metal wire of thickness about 1 to 8 mils, especially of stainless steel, as disclosed hereinafter.

According to the present invention, there is provided a twist-transference, false-twisting process for producing an intertwined yarn comprising (1) a core of a continuous annealed metal wire of thickness about 1 to 8 mils and of at least two continuous integral core elements of textile fibers and (2) surface wrappings of discontinuous fibers, which comprises continuously feeding loose discontinuous fibers, forwarding and supporting the fibers in a compressible fluid stream, continuously feeding separately said continuous multifilamentary core elements to converge with each other and the stream-supported discontinuous fibers and then passing through false-twisting means, false-twisting the core elements together to cause twist to back up and combine the discontinuous fibers with the core elements, and subsequently removing the twist from the core elements and reverse-twisting the discontinuous fibers tightly about and between the core elements by false twisting means to produce an intertwining of discontinuous fibers helically twisted about substantially straight core elements with portions of discontinuous fibers locked into place between the core elements, wherein said wire is fed into the process together with at least one of said core elements.

One of these fiber core elements preferably acts as a carrier for each such wire in the process, so the wire and this core element travel together from their sources of supply. If desired, more than one such wire may be incorporated in the core by such means.

As suggested by Field, the false twisting is preferably accomplished by applying a torque with a fluid jet to produce a yarn having fibers helically twisted about the core at a relatively constant twist level along the yarn.

As may be seen hereinafter, the process of the invention may be operated at speeds of over 200 mpm, and even above 300 mpm, and yet provide a satisfactory product.

This process accordingly provides an intertwined yarn comprising a core, composed of a wire and at least two continuous integral core elements of textile fibers, and intertwining fibers, composed of discontinuous textile fibers, the discontinuous fibers being tightly twisted about the core with portions of fibers locked into place in the core, and the core fibers being relatively straight and held together as a compact bundle by the discontinuous fibers, the wire being a continuous annealed wire of thickness about 1 to 8 mils in close proximity to and preferably surrounded by the continuous integral core elements of textile fibers. The thickness of the wire is preferably at least about 3 mils and preferably up to about 5 mils, and the wire is preferably of stainless steel. The total denier of the yarn may range from somewhat less than 1000 denier (say 800 denier) up to about 70,000 denier. For instance a 3 mil wire of stainless steel is equivalent to about 400 denier, and could be incorporated in a core of as little as about 600 denier (of suitable textile filaments) with about 120 denier of staple fibers to make a total of slightly more than 1100 denier for the composite yarn.

The intertwining fibers are preferably staple fibers helically twisted about the core at a relatively constant twist level along the yarn. The core elements are preferably bundles of continuous filaments that are preferably substantially free from twist, but may also include at least one core element that is a spun yarn composed of discontinuous fibers and at least one core element that is a continuous filament yarn, there being substantially no twist of such core elements about each other. The discontinuous fibers are preferably held in position by portions of such fibers being locked into place between core elements. The discontinuous fibers preferably comprise about 2% to 50% of the total weight of the yarn, especially about 10 to 40% of such total weight. Suitable discontinuous fibers generally have a length of 1 to 20 inches, and preferably a length of 2–4 inches. Preferred core elements are bundles of continuous filaments of p-aramid polymer, especially bundles of 200 denier or more, but may be other strong synthetic fibers, such as highly oriented polyolefin continuous filaments, and especially of 600 denier or more.

DETAILED DESCRIPTION OF THE INVENTION

The present invention solves the problem that has existed for many years by making use of the process taught in the nineteen sixties by Field, by incorporating selected metal wires into selected composite yarns of the general type taught by Field, and by solving the several problems posed by incorporating such a large and different continuous element into the core of such composite yarns. It would be superfluous to repeat the disclosures of the Field patents. Attention should be drawn, however, to Field's FIG. 3, which shows an artistic representation of a greatly enlarged cross-sectional view of his wrapped yarns.

Figure 2:
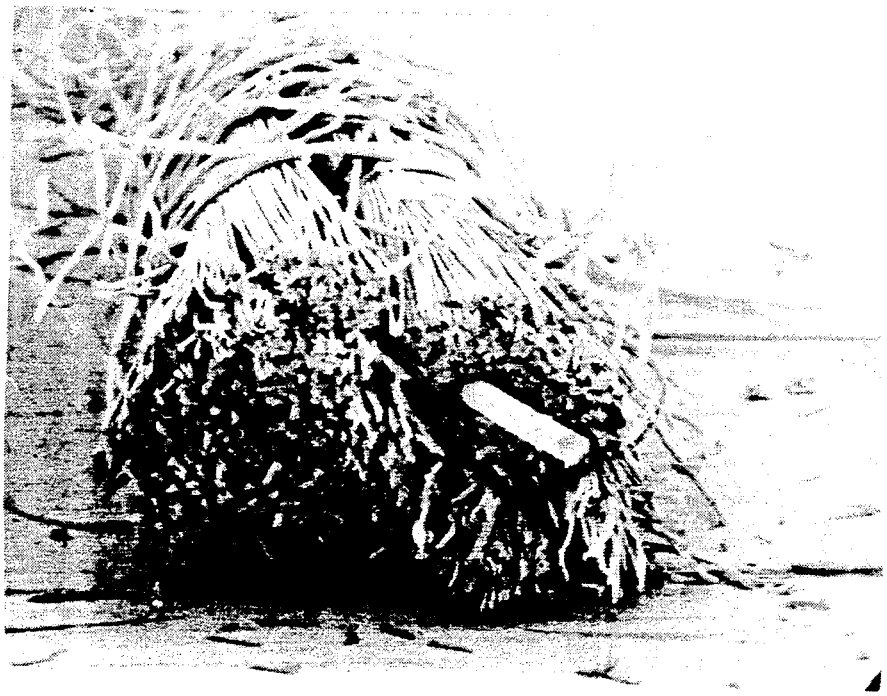
FIG. 2 is a photomicrograph of a yarn produced according to this invention.

In contrast, examination of FIG. 2 of the present application shows an actual photomicrograph, i.e. a greatly enlarged (50×magnification) photograph in contrast to Field's artistic representation. The actual bundles of filaments (in this instance continuous filaments) of the core elements can be seen, as well as the surface wrapping of discontinuous fibers. FIG. 2 shows a single metal wire, the large size of which contrasts with the much smaller sizes of the textile fibers. Also the centered location of the wire surrounded by the textile fibers is clearly shown in this cross-sectional view in FIG. 2 of the present application. This is highly desirable. It was surprising that the process of the present invention would give such a desirable result, and it is possible only in hindsight to speculate why this should occur. It is also evident from this photomicrograph that the binding action of the surface fibers is important, so long as it confines the reinforcing metal wire in the core. The aesthetics of the surface discontinuous fibers in terms of a softer hand may also be important for some applications, but not as important as the binding function, for other end-uses.

Field disclosed that continuous core elements may be comprised of virtually any fiber including polyester, nylon, polyolefin, and glass. Such elements may be continuous filament or spun yarns, or combinations of these. The continuous filament yarns may contain interlace or twist, or neither. If a spun yarn is used as a core element, it should preferably be accompanied by a continuous filament yarn to insure core integrity. The preferred core elements are p-aramid yarns and highly-oriented polyolefin yarns, and combinations thereof; an example of the former is PPDT poly (p-phenylene terephthalamide), while an example of the latter is used in some Examples. The term "highly-oriented polyolefin yarns" refers to yarns having tenacities of at least 15 gpd. It is also preferred that a sufficient number of the continuous (textile) core elements be used to cover, and preferably surround, the wire in the core.

The intertwining component is comprised of short fibers, desirably 1" to 20" in length, of almost any type of fiber, including polyester, nylon, polyolefin, stainless steel, aramid, including p-aramid, cotton, wool, etc.. The dpf (denier per filament) of these fibers should be sufficiently fine so that the fibers wrap around the core components. Typically, dpf's of 1 to 30 have been found to be useful; 2 to 4 dpf fibers are preferable.

The continuous metal wire may be made from essentially any metal which is formable into wire, has sufficient stability under use conditions of textiles, and is sufficiently bendable and twistable to withstand the rigors of the fiber-intertwining process. Thus, iron, steel, stainless steel, copper, brass, bronze, silver, tantalum, platinum, and such like metals are all potentially useful. Steel wire, particularly stainless steel wire, has been found to be particularly useful because of availability, cost and performance. Stainless steel wire in the range of about 1 mil to about 8 mils is useful, preferably 3 to 5 mils. "Annealed" rather than "hard" stainless steel wire should be used because the former has the resilience and twistability needed for the process of this invention. Below 1 mil, the wire has been difficult to see and work with, and has had very low strength; we prefer to use a wire of strength at least 0.2 gpd. Above 8 mils, the wire has resisted adopting the twist needed during processing and process continuity has not been maintained.

The yarns produced according to this invention are useful for a wide range of fabrics and end-use applications where cut-resistance is desired. The yarns can be woven or knit or used in so-called "non-woven" fabrics. The fabrics so produced can be fashioned into end-use articles to provide cut-resistance protection to persons or things. For example, knit fabrics might be used to make cut-resistant gloves for butchers or other food processors. Similarly, woven or knit fabrics can be used for cut-resistant clothing, aprons, chaps, etc.. Examples of utility in non-apparel applications are in cut-resistant tarpaulins, cut-resistant bags, fabric coverings for furniture or valuable artifacts, etc.

The invention is further described in the following Examples, with reference to a preferred apparatus, as illustrated schematically in FIG. 1. It will be noted that FIG. 1 herein is similar in many important respects to the illustration in FIG. 1 of the Field references, mentioned hereinabove, except as regards matters that may be different from Field's process. It would be superfluous to repeat herein what is similar and already described in the art. All parts and percentages herein are by weight, unless otherwise indicated.

EXAMPLES

A series of Examples of intertwined yarn, most having excellent cut-resistance, were prepared by the process of this invention. Five Comparatives were prepared by a similar process, without the wire, by way of contrast, and are included in the Table, for convenience, along with the Examples of the invention.

Figure 1:
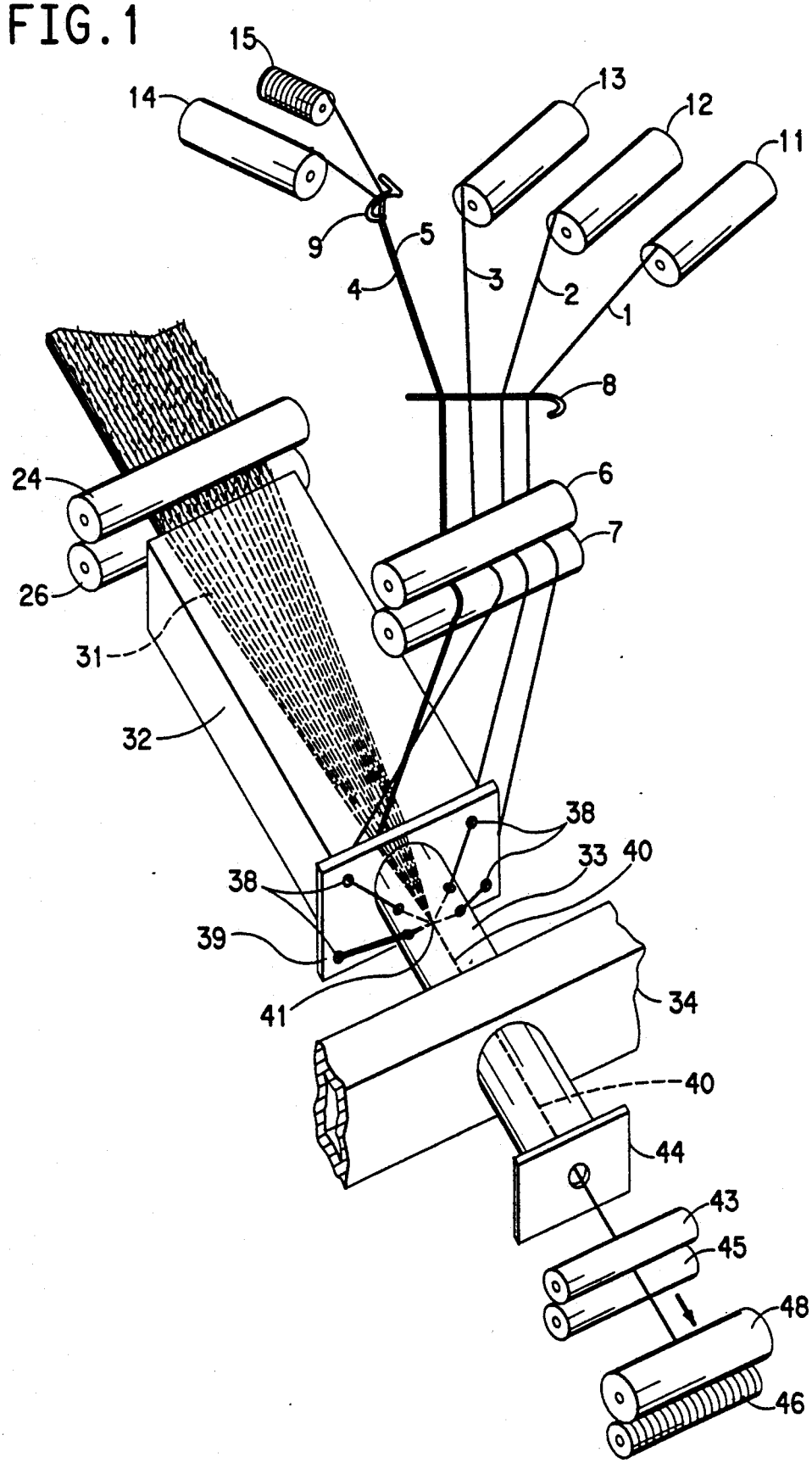
FIG. 1 is a schematic representation of a specific embodiment of the process and apparatus for producing the yarns of this invention.

The equipment is illustrated in FIG. 1. At least two continuous core elements (in all Examples and Comparatives these were continuous multifilament yarns) were fed from supply packages (such as yarns 1, 2, 3 or 4 from supply packages 11, 12, 13 and 14, in FIG. 1) past guide 8 to a pair of feed rolls (6 and 7; 7 is a driven roll, 6 is a nip roll) operating at a speed of 365 yards per minute, and then through separate openings (38) in a collector plate (39) and into a convergence tube (33) to form the desired yarn (40) at convergence point (41). For the Examples of the invention, at least one stainless steel wire is simultaneously fed to the collector plate and convergence tube in the same manner as the core elements. Each end of wire was processed together with one core element. This is desirable so that the core element "carries" or supports the wire and avoids abrasion and breakage of the wire. This is illustrated in FIG. 1 where core element 4 supports wire 5, being passed together around guide 9. The stainless steel wires were all annealed; we found that unannealed ("hard") wires could not be processed. This may have been because such wires were not flexible enough. In addition, we found that 1.6 and 3 mils stainless steel wires had to be supported or "carried" through the process by a core element to avoid overly frequent process interruptions; these thinner wires were quite weak and had tenacities of only about 0.3 and 1.25 grams per denier, respectively. The thicker 4.5 & 8 mil wires were processable without a "carrier" textile element, but should be fed together with such a textile core element to the convergence point 41.

A variety of core element yarns were used including PPDT poly (p-phenylene terephthalamide) yarns (200, 400 and 1000 denier yarns with 134, 267 and 660 filaments, respectively), HOPE highly-oriented polyethylene yarn (each of 650 denier, 60 filaments) and 2G-T poly(ethylene terephthalate) yarn (each of 220 denier, 50 filaments). The actual number of PPDT core element yarns used, their type and denier in each Example is shown in the Table. For example; under PPDT yarn in Example 1, 5×400 means 5 yarns of 400 denier each were simultaneously fed into the process. This Table also gives the number of HOPE yarns (of 650 denier) or of 2G-T yarns (of 220 denier), and , in the case of annealed stainless steel wires, the number used and wire thickness in mils; for example, 1×3 means 1 end of wire of 3 mils thickness. The discontinuous fibers used to intertwine the product were 2 inch, 2.25 dpf poly(ethylene terephthalate) fibers, gotten from drafting of 75 grain sliver; the weight % of such fibers in each Example and Comparative is given in Table 1. The 2G-T and PPDT yarns are commercially available from E. I. du Pont de Nemours and Company, of Wilmington, Del. The HOPE yarns are commercially available from Allied Chemical Corp. The sliver (31) was drafted 20-100X through a drafting section (not shown in FIG. 1). The fibers were picked up from final drafting rolls (24 and 26) at transfer box (32) via a vacuum line (34) and brought into contact with the core elements and wire(s) at the convergence point (41) in the convergence tube (33). The amount of discontinuous fiber introduced is controlled by the roll speeds in the drafting zone.

As false twisting device (44), a fluid jet of the type shown in FIG. 4 of U.S. Pat. No. 3,079,746 was operated with compressed air at about 185 psig at room temperature. The intertwined yarns exit the false twisting device, pass through let-down rolls (43, 45) and are wound upon a surface driven wind-up (48). The let-down rolls were run at about 3% less speed (at 354 yards per minute) than the feed rolls 6 and 7. The wind-up package (46) was operated at about 354 yards per minute for all Examples and Comparatives, but its precise speed was adjusted to keep adequate tension of the yarn during wind up.

To assess their cut-resistance, the intertwined yarns prepared above were knit into fabrics with weights ranging from about 10 to about 31 oz. per sq. yd., using a Shimaseiki glove knitting machine. Those fabrics which are double asterisked in Table 1 were prepared with two ends of intertwined yarn per feed to the knitting machine. All others were prepared with one end of yarn per feed. The fabrics so prepared were cut and sewn into gloves. The fingers of the gloves were cut off, mounted and tested for cut-resistance on a Betatec testing machine using a jumping cam with a 180 g. weight, as described herein. Table 1 gives the fabric weights and cut resistances of each Example and Comparative.

When annealed wire is incorporated according to the present invention, cut resistance is remarkably improved over the similar Comparative yarn by a factor from about 4 to about 24. Intertwined yarns with "Kevlar" aramid core elements yarns, or combinations of "Kevlar" yarns and highly oriented polyethylene yarns, give excellent cut-resistance when combined with only one wire. Intertwined yarns with polyester yarn core elements and an end of wire give good cut-resistance; these can be further enhanced by going to heavier fabrics. The addition of more wires (e.g., 2 or 3 or more) to the intertwined Examples of this invention further improve their cut resistance.

Cut-Resistance Test

Cut resistance tests were conducted using a modified "Betatec" (Registered trademark by Allied-Signal Inc.) procedure. The Betatec Testor was developed to evaluate cut-resistance of protective apparel by measuring the number of cycles required for a static razor blade under load to cut through a test fabric. The Testor used in these tests was modified to impart a lateral motion on the blade during cutting; to allow for the entire blade edge to be used during the cutting action. This reduces blade wear, permits use of a blade standardization step and, under the test conditions used, improved reproducibility of the obtained data.

TABLE

| | Core Elements (Yarns) | | | | | | Glove |
|---|---|---|---|---|---|---|---|
| Item | PPDT # × Denier | HOPE | 2G-T | 2G-T Sliver | Wire (# × Mils) | Fabric oz/sq. yd | Cut Resist (Ave. Cycles) |
| Ex. 1 | 5 × 400 | | | 20% | 1 × 3 | 16.1 | 268 |
| Ex. 2 | 2 × 1000 | | | 19% | 1 × 3 | 16.1 | 219 |
| Ex. 3 | 5 × 400 | | | 11% | 1 × 3 | 14.0 | 179 |
| A | 5 × 400 | | | 21% | — | 15.3 | 11 |
| Ex. 4 | 2 × 400 | 2 | | 19% | 1 × 3 | 16.6 | 132 |
| Ex. 5 | 1 × 1000 | 2 | | 17% | 1 × 3 | 17.5 | 224 |
| Ex. 6 | | 3 | | 14% | 1 × 3 | 15.5 | 76 |
| B | 2 × 400 | 2 | | 22% | — | 15.5 | 12 |
| Ex. 7 | 2 × 400 | 2 | | 10% | 1 × 3 | 15.5 | 137 |

TABLE-continued

| Item | Core Elements (Yarns) PPDT # × Denier | HOPE | 2G-T | 2G-T Sliver | Wire (# × Mils) | Fabric oz/sq. yd | Glove Cut Resist (Ave. Cycles) |
|---|---|---|---|---|---|---|---|
| Ex. 8 | 2 × 400 | 2 | | 15% | 1 × 3 | 15.6 | 171 |
| Ex. 9 | 2 × 400 | 2 | | 30% | 1 × 3 | 18.1 | 174 |
| C | 3 × 200 | | | 20% | — | 10.5** | 15 |
| Ex. 10 | 3 × 200 | | | 20% | 1 × 3 | 14.4** | 60 |
| Ex. 11 | 3 × 200 | | | 20% | 3 × 3 | 17.9** | 125 |
| D | 4 × 400 | | | 20% | — | 12.3 | 20 |
| Ex. 12 | 4 × 400 | | | 20% | 1 × 1.6 | 12.4 | 120 |
| Ex. 13 | 4 × 400 | | | 20% | 1 × 3 | 14.0 | 123 |
| Ex. 14 | 4 × 400 | | | 20% | 1 × 4.5 | 15.5 | 110 |
| Ex. 15 | 4 × 400 | | | 20% | 1 × 8 | | 274 |
| E | | | 6 | 16% | — | 19.7** | 4 |
| Ex. 16 | | | 6 | 11% | 1 × 3 | 20.7** | 20 |
| Ex. 17 | | | 6 | 10% | 1 × 1.6 | 23.7** | 57 |
| Ex. 18 | | | 6 | 10% | 2 × 3 | 27.8** | 137 |
| Ex. 19 | | | 6 | 10% | 3 × 3 | 31.3** | 224 |

**Two yarns were combined and knit together as a single feed

What is claimed is:

1. A twist-transference, false-twisting process for producing an intertwined yarn comprising (1) a core of a continuous annealed metal wire of thickness about 1 to 8 mils and of at least two continuous integral core elements of textile fibers and (2) surface wrappings of discontinuous fibers, which comprises continuously feeding loose discontinuous fibers, forwarding and supporting the fibers in a compressible fluid stream, continuously feeding separately said continuous multifilamentary core elements to converge at a convergence point with each other and the stream-supported discontinuous fibers and then passing through false-twisting means, false-twisting the core elements together to cause twist to back up and combine the discontinuous fibers with the core elements, and subsequently removing the twist from the core elements and reverse-twisting the discontinuous fibers tightly about and between the core elements by false twisting means to produce an intertwining of discontinuous fibers helically twisted about substantially straight core elements with portions of discontinuous fibers locked into place between the core elements, wherein said wire is fed to the convergence point together with at least one of said core elements.

2. The process of claim 1, wherein the false twisting is accomplished by applying a torque with a fluid jet to produce a yarn having fibers helically twisted about the core at a relatively constant twist level along the yarn.

3. The process of claim 1, wherein the discontinuous fibers have a length of about 1 to 20 inches.

4. The process of claim 3 wherein the discontinuous fibers have a length of about 2 to about 4 inches.

5. The process of claim 1, wherein the core elements are bundles of continuous filaments.

6. The process of claim 1, wherein at least one core element is a spun yarn and at least one other core element is a bundle of continuous filaments.

7. The process of claim 1, wherein the discontinuous fibers constitute 2–50% by weight of the total weight of the yarn.

8. The process of claim 8, wherein the discontinuous fibers constitute 10–40% by weight of the total weight of the yarn.

9. The process of claim 1, wherein the thickness of the wire is about 1 to 5 mils.

10. The process of claim 9, wherein the thickness of the wire is about 3 to 5 mils.

11. The process of any one of claims 1, 9 and 10, wherein said wire is stainless steel.

12. The process of claim 1, wherein said core elements are bundles of continuous filaments of p-aramid polymer.

13. The process of claim 12, wherein the bundles of continuous filaments are each of at least 200 denier.

14. The process of claim 1, wherein said core elements are bundles of highly-oriented polyolefin filaments.

15. The process of claim 14, wherein the bundles of continuous filaments are each of at least 600 denier.

* * * * *